US012654563B2

(12) United States Patent
Na et al.

(10) Patent No.: US 12,654,563 B2
(45) Date of Patent: Jun. 16, 2026

(54) METHOD FOR LIMITING ACTIVE ACCELERATION BASED ON DRIVING SITUATIONS AND A VEHICLE DRIVABLE THEREBY

(71) Applicants: HYUNDAI MOTOR COMPANY, Seoul (KR); KIA CORPORATION, Seoul (KR)

(72) Inventors: Chang Eun Na, Seongnam-si (KR); Young Kwang Kim, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 20 days.

(21) Appl. No.: 18/769,094

(22) Filed: Jul. 10, 2024

(65) Prior Publication Data

US 2025/0153577 A1     May 15, 2025

(30) Foreign Application Priority Data

Nov. 14, 2023    (KR) ........................ 10-2023-0157013

(51) Int. Cl.
B60L 15/20 (2006.01)

(52) U.S. Cl.
CPC ........... B60L 15/20 (2013.01); B60L 2240/16 (2013.01); B60L 2240/443 (2013.01); B60L 2240/64 (2013.01); B60L 2240/68 (2013.01)

(58) Field of Classification Search
CPC ................ B60L 15/20; B60L 2240/16; B60L 2240/443; B60L 2240/64; B60L 2240/68; B60W 30/18009; B60W 40/04; B60W 40/06
See application file for complete search history.

(56) References Cited

U.S. PATENT DOCUMENTS

| | | | | |
|---|---|---|---|---|
| 2016/0207393 A1* | 7/2016 | Takamiya | ............... | B60L 58/24 |
| 2016/0221571 A1* | 8/2016 | Chen | ...................... | B60W 10/06 |
| 2018/0057001 A1* | 3/2018 | Hu | .......................... | B60K 35/29 |
| 2021/0031764 A1* | 2/2021 | Roques | ................... | B60L 15/20 |
| 2022/0402481 A1* | 12/2022 | Books | ..................... | B60L 58/12 |
| 2023/0119914 A1* | 4/2023 | Lee | ........................ | B60W 10/06 |
| | | | | 701/22 |

* cited by examiner

*Primary Examiner* — George C Jin
(74) *Attorney, Agent, or Firm* — Lempia Summerfield Katz LLC

(57) ABSTRACT
A method for limiting active acceleration of a vehicle based on driving situations and a vehicle drivable thereby are provided. The method includes detecting presence of an acceleration limitation situation based on driving situation information. The method also includes, in response to detecting the presence of the acceleration limitation situation, generating an acceleration limit based on situation type information identified in the driving situation information. The method additionally includes determining, as control torque, a smaller torque among an acceleration torque limit based on the acceleration limit and required torque according to a driving maneuver request. The method further includes controlling driving of the vehicle based on acceleration according to the control torque on a path corresponding to the acceleration limitation situation.

20 Claims, 6 Drawing Sheets

METHOD FOR LIMITING ACTIVE ACCELERATION BASED ON DRIVING SITUATIONS AND A VEHICLE DRIVABLE THEREBY

CROSS REFERENCE TO RELATED APPLICATION

The present application claims the benefit of and priority to a Korean Patent Application No. 10-2023-0157013, filed in the Korean Intellectual Property Office on Nov. 14, 2023, the entire contents of which are incorporated herein by reference.

TECHNICAL FIELD

The present disclosure relates to a method for limiting active acceleration based on driving situations and a vehicle drivable thereby.

BACKGROUND

In case a vehicle is driven in a zone that requires slowing down, such as a congested area, a road with frequent speed limit zones, or a road with a structure making high-speed driving difficult, the vehicle may be driven by a repeated operation of crawling and acceleration, as compared with a conventional case where high-speed driving is possible. As for the behavior of a vehicle in a slow-down zone, the vehicle may simply decelerate to slow down, but accelerated driving may occur to increase speed a little during low-speed driving according to a situation.

Accelerated driving is accompanied by control that increases acceleration. However, excessive accelerated driving may exceed a speed required in a slow-down zone. To be driven according to a situation of the slow-down zone, a vehicle may have a sudden decelerating operation after excessive accelerated driving. Apart from such a sudden change in the driving speed of the vehicle, if the vehicle has an excessive turning operation in the slow-down zone, a sharp subsequent turning operation may follow. Accordingly, excessive turns may occur successively.

Energy efficiency of a vehicle may be reduced by a behavior of the vehicle hindering stable driving in a slow-down zone, such as in situations of a sudden change of a driving speed or a succession of excessive turns. Energy efficiency may be electricity efficiency in an electric energy-based vehicle or fuel efficiency in a fossil energy-based vehicle. In addition, the above-described behavior of a vehicle may cause an excessive increase in torque of powertrain and a change thereof. Thus, the vehicle may not have a stable movement. This may be the cause of poor riding comfort. Furthermore, a dramatic change of behavior of a vehicle may negatively affect an occupant's safety. In addition, the dramatic change of behavior may compromise safety or protection of an object in a slow-down zone, for example, a pedestrian or a delicate facility located in the slow-down zone.

SUMMARY

Embodiments of the present disclosure provide a method for limiting active acceleration based on driving situations and a vehicle drivable thereby. The disclosed method and vehicle may not only realize reduced acceleration torque and enhanced energy efficiency, but may also ensure riding comfort, an occupant's safety, and safety of a neighboring object, such as a pedestrian, during launch acceleration.

The technical objects of the present disclosure are not limited to the above-mentioned technical objects. Other technical objects that are not mentioned should be readily understood by those having ordinary skill in the art from the following description.

According to an embodiment of the present disclosure, a method is provided for limiting active acceleration of a vehicle according to a driving situation. The method includes detecting presence of an acceleration limitation situation based on driving situation information. The method also includes, in response to detecting the presence of the acceleration limitation situation, generating an acceleration limit based on situation type information identified in the driving situation information. The method additionally includes determining, as control torque, a smaller torque among an acceleration torque limit based on the acceleration limit and required torque according to a driving maneuver request. The method further includes controlling driving of the vehicle based on acceleration according to the control torque on a path corresponding to the acceleration limitation situation.

According to an embodiment, the driving situation information may include traffic information and road information. The traffic information may include a traffic flow state around the vehicle. The road information may include information on at least one of a driving caution zone or a road form. The driving caution zone may include at least one of i) a facility zone in which a supplementary facility for deriving or monitoring a speed limit is located, ii) a sign zone in which a sign object associated with a speed limit is located, iii) a protection zone for protecting a predetermined object, or iv) a congested zone that is estimated to have a degree of road congestion equal to or greater than a predetermined value.

According to an embodiment, the presence of the acceleration limitation situation may be detected based on estimating that the vehicle is required to slow down based on the driving situation information.

According to an embodiment, the acceleration limitation situation may include a longitudinal acceleration limitation situation according to a longitudinal direction of the vehicle and a lateral acceleration limitation situation according to a lateral direction of the vehicle. Generating the acceleration limit may include generating at least one of i) a longitudinal acceleration limit corresponding to the longitudinal acceleration limitation situation or ii) a lateral acceleration limit corresponding to the lateral acceleration limitation situation based on the situation type information associated with at least one of the longitudinal acceleration limitation situation or the lateral acceleration limitation situation. The acceleration torque limit may include at least one of i) a longitudinal acceleration torque limit based on the longitudinal acceleration limit or ii) a lateral acceleration torque limit based on the lateral acceleration limit. The required torque includes at least one of longitudinal required torque or lateral required torque.

According to an embodiment, a driving mode operated for driving of the vehicle may include i) a first driving mode that controls driving based on the driving maneuver request and ii) a second driving mode that a) controls driving according to an optimization setting established based on the driving maneuver request and a predetermined vehicle operation purpose and b) applies second longitudinal acceleration smaller than first longitudinal acceleration applied to the first driving mode. The longitudinal acceleration limit may be generated based on the second longitudinal acceleration.

According to an embodiment, the longitudinal acceleration limit may be i) set to be smaller than the second longitudinal acceleration and ii) generated according to detailed situation information of the driving situation information based on a slow-down requirement of the situation type information.

According to an embodiment, the lateral acceleration limit may be generated according to detailed situation information of the driving situation information based on a degree of turn permission of the situation type information.

According to an embodiment, the acceleration torque limit may be further based on an acceleration estimate calculated based on at least one of a driving speed of the vehicle or a degree of turn of the vehicle.

According to an embodiment, the acceleration estimate may be calculated by using a feedback method. The feedback method may include modeling according to a weight of the vehicle. The feedback method may calculate the acceleration estimate based on a previous acceleration estimate, the driving speed of the vehicle, the degree of turn of the vehicle, the acceleration limit, and the acceleration torque limit.

According to an embodiment, the method may further include detecting, prior to the generating of the acceleration limit, whether a limitation release condition occurs by at least one of the driving maneuver request for releasing the acceleration limitation situation or a behavior of the vehicle. The method may additionally include, in response to detecting that the limitation release condition occurs, controlling the driving of the vehicle based on the driving maneuver request without generating the acceleration limit.

According to another embodiment of the present disclosure, a vehicle is provided. The vehicle includes a sensor unit configured to detect a state of the vehicle and a maneuver for the vehicle. The vehicle also includes a memory configured to store at least one instruction for controlling the vehicle. The vehicle further includes a processor configured to execute the at least one instruction stored in the memory. The processor is configured to detect presence of an acceleration limitation situation based on driving situation information. The processor is also configured to generate an acceleration limit based on situation type information identified in the driving situation information. The processor is additionally configured to, in response to detecting the presence of the acceleration limitation situation, determine, as control torque, a smaller torque among an acceleration torque limit based on the acceleration limit and required torque according to a driving maneuver request. The processor is further configured to control driving of the vehicle based on acceleration according to the control torque on a path corresponding to the acceleration limitation situation.

The features briefly summarized above for this disclosure are only example aspects of the detailed description of the present disclosure. These features are not intended to limit the scope of the present disclosure.

According to embodiments of the present disclosure, a method for limiting active acceleration and a vehicle drivable thereby are provided. The method and vehicle not only realize reduced acceleration torque and enhanced energy efficiency, but also ensure riding comfort, an occupant's safety, and safety of a neighboring object, such as a pedestrian, during launch acceleration.

The effects obtainable from embodiments of the present disclosure are not limited to the above-mentioned effects.

Other effects not mentioned herein should be readily understood by those having ordinary skill in the art from the following description.

DETAILED DESCRIPTION

Figure 1:
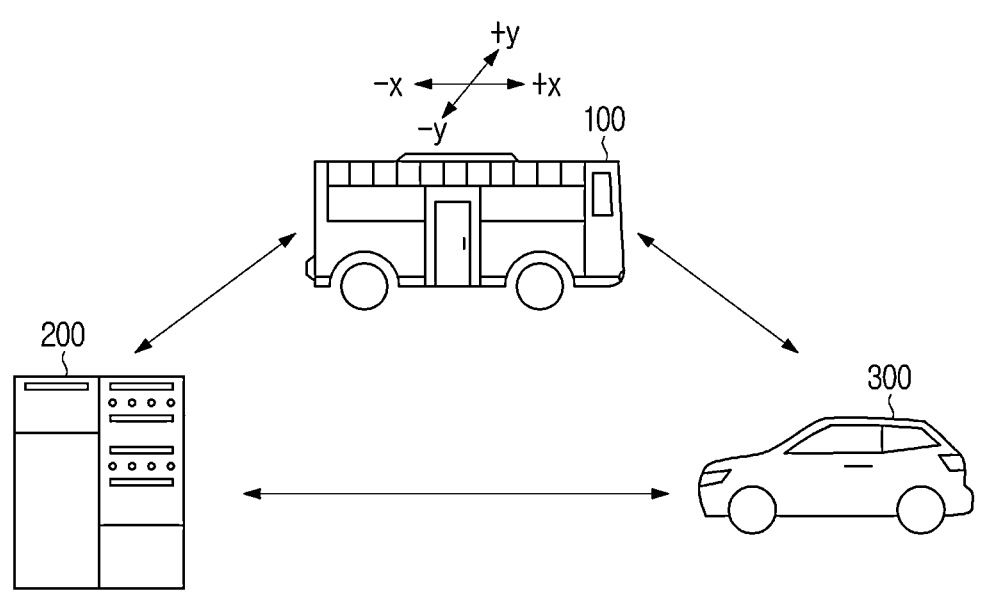
FIG. 1 is a view of a vehicle communicating with another device to transmit and receive data, according to embodiments of the present disclosure.

Hereinafter, embodiments of the present disclosure are described in detail with reference to the accompanying drawings to enable those having ordinary skill in the art to readily implement the embodiments of the present disclosure. However, embodiments of the present disclosure may be implemented in various different ways. The present disclosure is not limited to the embodiments described therein.

In describing embodiments of the present disclosure, well-known features, functions, or constructions have not been described in detail where it was determined that a detailed description thereof may unnecessarily obscure the gist of the present disclosure. The same constituent elements in the drawings are denoted by the same reference numerals, and a repeated description of the same elements has been omitted.

In the following description, when an element is simply referred to as being "connected to", "coupled to" or "linked to" another element, this may mean that the element is "directly connected to", "directly coupled to" or "directly linked to" to the other element, or that the element is connected to, coupled to, or linked to the other element with one or more elements intervening therebetween. In addition, when an element is described as "including" or "having" another element, this means that the element may further include the other element. Such terms do not preclude the possibility that the element "includes" or "has" one or more further elements or components unless specifically stated otherwise.

In the present disclosure, the terms first, second, etc. are only used to distinguish one element from another. Such terms do not limit the order or the degree of importance between the elements unless specifically mentioned. Accordingly, a first element in an embodiment could be termed a second element in another embodiment, without departing from the scope of the present disclosure. Similarly, a second element in an embodiment could be termed a first element in another embodiment, without departing from the scope of the present disclosure.

In the present disclosure, elements that are distinguished from each other are distinguished merely for clearly describing each feature. The distinctions do not necessarily mean that the elements are separated. For example, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements. Some of the elements may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present disclosure and the way of attaining them should become more apparent with reference to embodiments described below in detail in conjunction with the accompanying drawings. Embodiments, however, may be embodied in many different forms and should not be constructed as being limited to example embodiments set forth herein. Rather, these embodiments are provided to ensure that this disclosure is complete and fully conveys the scope of the disclosure to those having ordinary skill in the art.

In the present disclosure, each of phrases such as "A or B", "at least one of A and B", "at least one of A or B", "A, B or C", "at least one of A, B and C", "at least one of A, B or C" and "at least one of A, B, C or combination thereof" may include any one or all possible combinations of the items listed together in the corresponding one of the phrases.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described with reference to the accompanying drawings.

A vehicle in which limiting of active acceleration based on a driving situation may be performed, according to an embodiment of the present disclosure, is described below with reference to FIGS. 1-2.

FIG. 1 is a view illustrating a vehicle communicating with another device to transmit and receive data, according to an embodiment.

Referring to FIG. 1, a vehicle 100 may be driven using electric energy or fossil energy. In the case of electric energy, the vehicle 100 may be, for example, a pure battery-based vehicle driven only by a high-voltage battery, or the vehicle 100 may also employ a gas-based fuel cell as an energy source. In the case of a fuel cell, the vehicle 100 may charge a high-voltage battery by power generation of the fuel cell and execute various functions required by the modules of the vehicle 100 by output power of the high-voltage battery. In addition, a fuel cell may use various types of gas capable of generating electric energy. For example, the gas may be hydrogen. However, the gas is not limited thereto. Various gases may be used.

In the case of fossil energy, the vehicle 100 may be driven based on fuels such as gasoline, diesel, or liquefied gas. The vehicle 100 may be equipped with an engine that drives a wheel drive unit 116 by combustion of the fuel. The engine may be included in a driving force generator 108 from a perspective of providing a driving torque of a wheel to the wheel drive unit 116.

For convenience of explanation, the present disclosure describes an example in which an electric energy vehicle is the fuel cell-based vehicle 100. However, the present disclosure is also applicable to a vehicle in which a high-voltage battery and a cell are of different types. Such vehicle may employ a method of charging the high-voltage battery by power generation of the cell to output power for the start-up and drive of the vehicle 100 and a load device 118. As another example, except for regenerative braking, charge, and discharge described in the present disclosure, embodiments of the present disclosure are also applicable to a vehicle based on fossil energy.

The vehicle 100 may refer to a device capable of moving. The vehicle 100 may be a ground vehicle driven on the ground. The vehicle 100 may be, for example, a normal passenger vehicle or commercial vehicle, a mobile office, or a mobile hotel. The vehicle 100 may be a four-wheel vehicle, such as a sedan, a sports utility vehicle (SUV), a pickup truck, and/or the like. In some examples, the vehicle 100 may be a vehicle with five or more wheels, such as a bus, a lorry, a container truck, a heavy vehicle, and/or the like. The vehicle 100 may be drivable by manual driving or autonomous driving (either semi-autonomous or full-autonomous driving). The present disclosure describes an example in which the vehicle 100 is a multi-passenger vehicle that is capable of carrying a plurality of persons either seated or standing and is controlled by autonomous driving.

The vehicle 100 may perform communication with another device 200 and/or another vehicle 300 under the control of a communication control unit (CTU) mounted in the vehicle 100. For example, the other device 200 may include a server 200 for supporting various control, state management and driving of the vehicle 100, an intelligent transportation system (ITS) device for receiving information from an ITS, and/or various types of user devices.

The vehicle 100 may communicate with another vehicle or another device using cellular communication, wireless access in vehicular environment (WAVE) communication, dedicated short range communication (DSRC) or short range communication, or any other communication scheme.

For example, the vehicle 100 may use Long Term Evolution (LTE) as a cellular communication network, a communication network such as 5G, a WiFi communication network, a WAVE communication network, and/or the like to communicate with the server 200 and the other vehicle 300. Further, DSRC used in the vehicle 100 may be used for vehicle-to-vehicle communication. A communication scheme among the vehicle 100, the server 200, another vehicle 300, and a user device is not limited to the above-described embodiment.

In order to support autonomous driving and various services for the vehicle 100, the server 200 may transmit various types of information and software modules used for controlling the vehicle 100 to the vehicle 100 as a response to a request and/or data received from the vehicle 100 and/or a user device.

Figure 2:
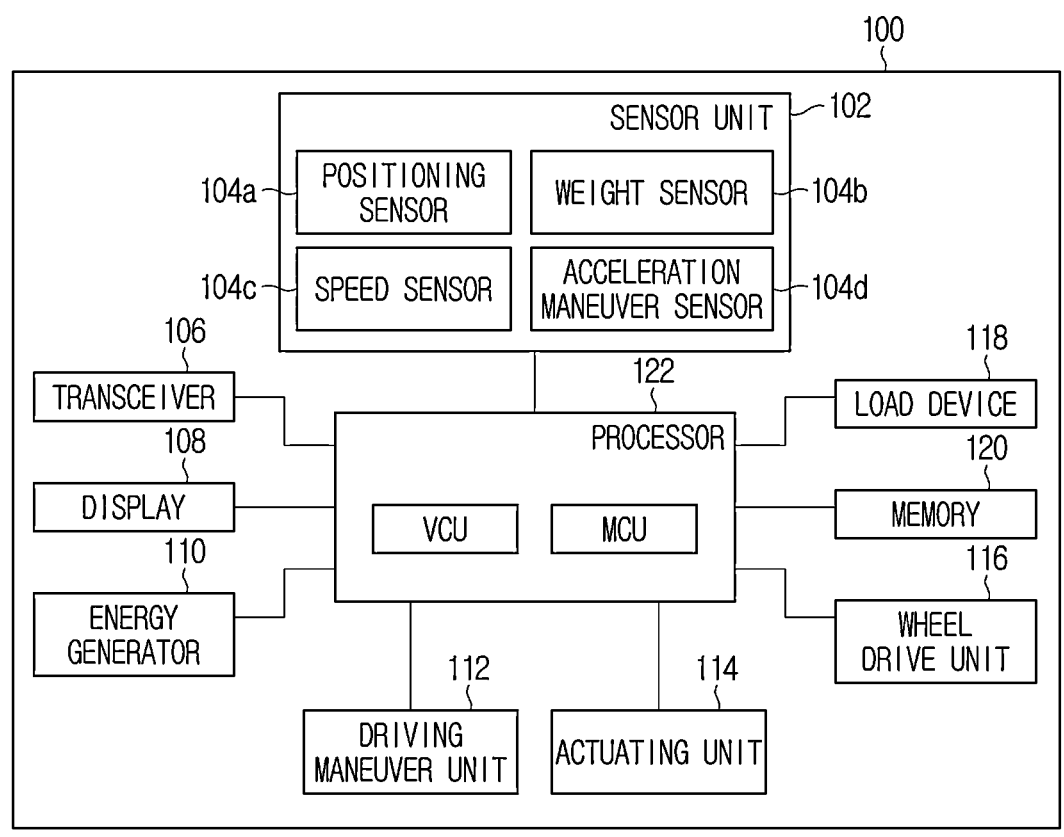
FIG. 2 is a view showing constituent modules of a vehicle, according to an embodiment of the present disclosure.

FIG. 2 is a view showing constituent modules of a vehicle, according to an embodiment of the present disclosure.

The vehicle 100 may include a sensor unit 102, a transceiver 106, and a display 108.

The sensor unit 102 may be equipped with various types of detectors for sensing various states and situations occurring or measured in external and internal environments of the vehicle 100 and for identifying position information of the vehicle 100.

For example, the sensor unit 102 may be equipped with a positioning sensor 104a for obtaining location information of the vehicle 100, a weight sensor 104b, a speed sensor 104c for measuring a current driving speed of the vehicle 100, and an acceleration maneuver sensor 104d.

The weight sensor 104b may measure or estimate a weight of a load on the vehicle 100. For example, the load may be an occupant and/or luggage. The weight sensor 104b may directly sense a weight of a load. The weight sensor 104b may also indirectly sense a weight of a load through a specific module of the vehicle 100. For example, weight sensor 104b may sense a change of suspension or a driving parameter of the vehicle 100 between a loaded state and an unloaded state, such as a change in driving speed, torque on a wheel, drive energy, and/or the like.

The speed sensor 104c may be a wheel speed sensor. However, the speed sensor 104c is not limited thereto. The speed sensor 104c may be implemented in various forms of sensors measuring a driving speed.

The acceleration maneuver sensor 104d may sense a change of a driving maneuver request required by a driver performing manual driving or autonomous driving or a processor 122. A driving maneuver request may include a longitudinal maneuver request and/or a lateral maneuver request. A longitudinal maneuver request may include, for example, a wheel-accelerating/decelerating maneuver through an accelerator pedal. As another example, the longitudinal maneuver request may include a request provided via a hard/soft interface of a driving maneuver unit 112 and an operation/command requested, without involvement of an accelerator pedal or interface, to an actuating unit 114 or a wheel drive unit 116 for wheel acceleration and deceleration. A lateral maneuver request may include a request related to a steering maneuver for a steering wheel belonging to the driving maneuver unit 112 and an operation/command requested for steering of a wheel without involvement of a steering wheel. For example, a sensor capable of sensing a maneuver request of an accelerator pedal may be implemented as an accel pedal sensor (APS).

The present disclosure mainly describes sensors of the sensor unit 102 referred to for description of embodiments of the present disclosure. In some embodiments, the sensor unit 102 may further include one or more additional sensors for detecting various situations not listed herein. For example, in order to identify a surrounding environment of the vehicle 100, a driving position, and/or the like, a camera lidar sensor, a radar sensor, a gyro sensor, and/or the like may be provided.

The transceiver 106 may support mutual communication with the server 200, the neighboring vehicle 300, and/or the like. In an embodiment, the transceiver 106 may transmit data generated or stored during driving to the server 200. The transceiver 106 may also receive data and software modules transmitted from the server 200. The vehicle 100 may transmit and receive data used in methods according to embodiments of the present disclosure to and from the outside through the transceiver 106. In embodiments, the transceiver 106 may receive and forward map information and driving situation information to a memory 120 and the processor 122.

The display 108 may serve as a user interface. The processor 122 may cause the display 108 to display an operating state and a control state of the vehicle 100, path/traffic information, information on an energy remaining quantity, a content requested by a driver, and the like to be output. The display 108 may be configured as a touch screen capable of sensing a driver input and receive a request of a driver indicated to the processor 122.

The vehicle 100 may include an energy generator 110, the driving maneuver unit 112, the actuating unit 114, the wheel drive unit 116, and the load device 118.

The energy generator 110 may generate and supply power and electricity used for a driving power system such as the wheel drive unit 116 and the load device 118. For example, in the case that the vehicle 100 is driven based on electric energy, the energy generator 110 may be configured as an electric battery or may be configured as a combination of an electric battery and a fuel cell for charging the battery. In the case of a combination of an electric battery and a fuel cell, the energy generator 110 may include a tank for storing a material used to produce power of the fuel cell, such as hydrogen gas. In the case that the vehicle 100 is driven based on fossil energy, the energy generator 110 may be configured as an internal combustion engine.

The driving maneuver unit 112 may be composed of a module that accepts a driving operation request provided by a driver or the processor 122. For example, the driving maneuver unit 112 may include an accelerator pedal and a brake pedal accepting a driving acceleration/deceleration request, a hard/soft key receiving a driving acceleration/deceleration request, a steering wheel accepting a steering request and/or a key receiving a steering request, a lever or key of a blinker for lane change, and/or the like.

The actuating unit 114 may be equipped with at least one module that implements a driving operation requested by the driving maneuver unit 112 or the processor 122. The actuating unit 114 may be equipped with a mechanical module or an electronic module that implements, in the wheel drive unit 116, at least one driving operation of longitudinal control along +X~−X illustrated in FIG. 1, such as acceleration/deceleration control of the vehicle 100, and lateral control along +Y~−Y illustrated in FIG. 1, such as steering control. The electronic module may process signals associated with the controls.

The wheel drive unit 116 may include a plurality of wheels, a driving force transfer module for generating and giving a driving force to wheels or for transferring a driving force, a braking module for decelerating the driving of wheels, and a steering module for realizing lateral control of wheels. In the case that the vehicle 100 is driven based on electric energy, the driving force transfer module may be composed of a motor module and an inverter that generate a driving force based on power output from an electric battery. In the case that the vehicle 100 is operated based on fossil energy, a driving force transfer module may be equipped with transmission and a gear module that transfer power of an internal combustion engine.

The load device 118 may be an auxiliary equipment mounted on the vehicle 100. The load device 118 may consume power supplied from the energy generator 110 by an occupant or user or converted from output of the energy generator 110. The load device 118 may be a type of electric device for non-driving purpose. The load device 118 may thus not be equipped with a driving power system such as the wheel drive unit 116. For example, the load device 118 may be a device installed in an air-conditioning system, a light system, a seat system, etc., of the vehicle 100.

In addition, the vehicle 100 may include the memory 120 and the processor 122.

The memory 120 may store an application (e.g., at least one instruction) for controlling the vehicle 100 and various data. The application stored may be loaded at a request of the processor 122. The data may be read and recorded at a request of the processor 122. According to embodiments of the present disclosure, in response to detecting the presence of an acceleration limitation situation based on driving situation information, the processor 122 may generate an acceleration limit based on situation type information identified in the driving situation information. The processor may also determine, as control torque, a smaller torque among acceleration limit torque based on at least the acceleration limit and required torque according to a driving maneuver request. The processor 122 may control a vehicle based on acceleration according to the control torque on a path corresponding to the acceleration limitation situation.

In an embodiment, the memory 120 may hold and manage map information for identifying a location of the vehicle 100. Map information may be used to generate a driving path set in the vehicle 100 at a request of a user or the processor 122 or to obtain driving situation information on a path ahead. In addition, map information may be used for autonomous driving. Map information may include a low definition map or include an HD map together with the map. Map information may be provided to have various information and data included in the above-described object and environment.

The memory 120 may receive and store driving situation information corresponding to a location of the vehicle 100 during driving from the server 200. According to driving situation information, the memory 120 may transmit an acceleration limit and control torque matching an acceleration limitation situation requiring slowing down to the processor 122.

For example, driving situation information may include various information according to driving situations, such as traffic information and road information. Driving situation information may be used not only for limiting acceleration according to embodiment of the present disclosure, but also for processing various controls of manual or autonomous driving.

Traffic information may include a traffic flow state around the vehicle 100. For example, traffic information may include a degree of traffic smoothness and accident information on a road or path ahead of the vehicle 100. A degree of traffic smoothness may be an indicator associated with a vehicle flow state on a road caused by driving/stopped vehicles and people and may be classified into, for example, traffic smoothness, delay and jam. Accident information may be information associated with factors affecting a traffic flow on a road where driving is to be performed, such as an accident, a construction work, and/or a worsening weather condition. Accident information may include intensity of a factor and may have a degree of traffic smoothness estimated according to factor intensity.

Road information may have information on at least one of a driving caution zone or a road form.

For example, a driving caution zone may include at least one of a facility zone where a supplementary facility for deriving or monitoring a speed limit is located, a sign zone where a sign object associated with a speed limit is located, a protection zone for protecting a predetermined object, or a congested zone estimated to have a degree of road congestion equal to or greater than a predetermined value. The supplementary facility for deriving or monitoring a speed limit may include a speed camera, a speed limit, a sign related to a slow-down zone, and a speed bump. The sign object may be a speed limit mark or a slow-down zone mark on a road. The speed limit or a slow-down zone associated with a sign object may be included in map information. The information associated with a sign object may be obtained from map information and be used as a type of driving situation information.

The protection zone may be a zone for protecting a predetermined object, such as a weak pedestrian and/or a safety structure present near a road. For example, the protection zone may be a school zone, a children/elderly protection zone, and/or the like. A speed limit and a region that are associated with a protection zone may be included in map information. Such information may be obtained from map information and used as a type of driving situation information. The congested zone may be a region that is estimated to be congested based on an existing pedestrian volume, an existing traffic volume, a road structure, and density of facilities adjacent to a road. Even when a smooth traffic flow appears in current traffic information, a congested zone may be a point where a demand for slowing down is estimated due to an unexpected traffic volume, potential congestion caused by an increasing pedestrian volume, complexity of road infrastructure, and/or density of facilities. The congested zone may be designated when the above-described factors have a predetermined value or above.

The road form may include a road structure indicated by a width of road/lane, curvature of a road, a gradient of a road, an entry/exit junction connecting a plurality of roads, a joint shape of roads, a U-turn point, and/or the like. Information associated with a road form may be included in map information in some cases. The information associated with a road form may be obtained from map information and used as a type of driving situation information. Furthermore, as for a road form included in driving situation information, road structures that hinder driving safety of the vehicle 100 through sudden acceleration and deceleration and/or sudden turning of the vehicle 100 may mainly be provided to the transceiver 106 and/or the processor 122. A road form thus provided may be selectively provided based on, for example, specifications and features of the vehicle 100. As an example, a commercial car may have such features as a heavy weight and a high center of gravity. If such a commercial car is driven by sudden acceleration on a turning ramp that is an entry/exit of an expressway, the commercial car may flip over due to the above-described features. Accordingly, the turning ramp as an entry/exit of an expressway may be provided to a commercial car with such features but may not be provided to a vehicle without such features.

The processor 122 may perform overall control of the vehicle 100. The processor 122 may be configured to execute applications and instructions stored in the memory 120. The processor 122 may enable autonomous driving in response to an autonomous driving request by a user or a setting of the vehicle 100 itself. The processor 122 may then control the vehicle 100 to enable autonomous driving at a level applied to the vehicle 100. In addition, the processor 122 may disable autonomous driving by a user's release or at a request according to automatic release. The processor 122 may then control the vehicle 100 to be manually driven.

According to an embodiment, the processor 122 may detect whether an acceleration limitation situation is present or absent based on driving situation information, by using an application, instructions and data stored in the memory 120. In response to detecting the presence of the acceleration limitation situation, the processor 122 may generate an acceleration limit based on situation type information identified by the driving situation information. The processor 122 may determine a smaller torque among acceleration limitation torque based on at least an acceleration limit and required torque according to a driving maneuver request as control torque. The processor 122 may control driving of a vehicle based on acceleration according to control torque on a path corresponding to an acceleration limitation situation.

In an embodiment, the processor 122 may implement the above-described processing as distributed processing over a plurality of processing modules. For example, detection of an acceleration limitation situation, generation of an acceleration limit, and determination of control torque may be processed by a vehicle control unit (VCU). Further, in the case of a vehicle driven based on electric energy, driving control according to control torque may be processed by a motor control unit (MCU). As another example, the processor 122 may be implemented as a single processing module. In the present disclosure, the processor 122 may collectively refer to a plurality of processing modules.

The above-described processing of the processor 122, according to embodiments, is described in more detail below with reference to FIGS. 3-6.

Figure 3:
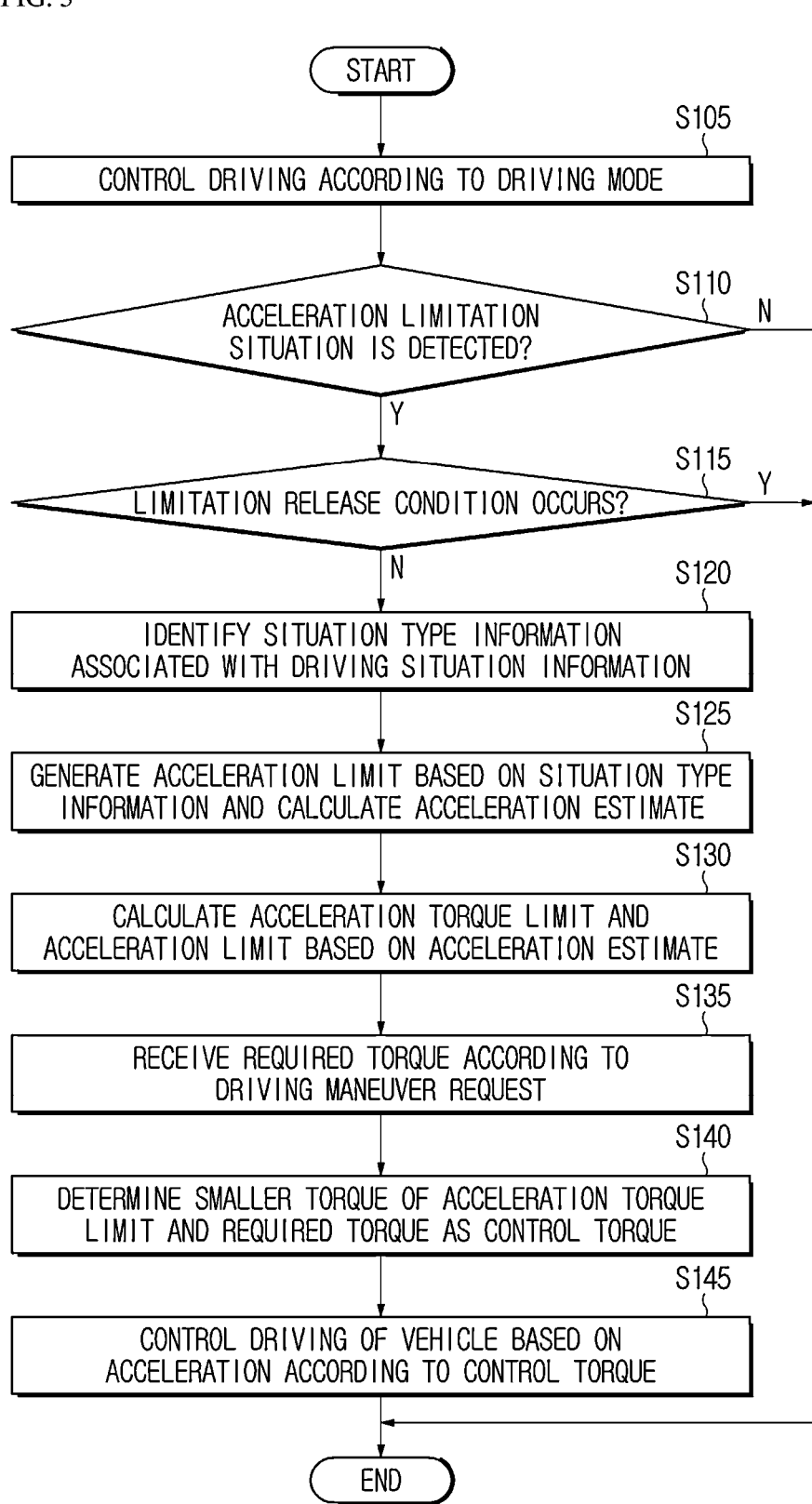
FIG. 3 is a flowchart of a method for limiting active acceleration based on a driving situation, according to an embodiment of the present disclosure.

FIG. 3 is a flowchart of a method for limiting active acceleration based on a driving situation, according to another embodiment of the present disclosure.

In an operation S104, the processor 122 of the vehicle 100 may identify a driving mode applied to current driving and control driving according to the driving mode.

A driving mode may be designated by a request of a driver or the processor 122. For example, the driving mode may be presented as a driving control option by the processor 122. The driving mode may be provided in a form of a plurality of options and may be presented to a driver in various forms of driving control modes in consideration of energy efficiency, a driving style, passenger convenience, safety, and/or energy remains. The driving mode may be presented through the display 108 to be designated by a user. In another example, the driving mode may be designated by the processor 122 suitably for a vehicle condition and a driving situation. In addition, in the case that a predetermined driving situation occurs during driving in a specific driving mode, the processor 122 may change the specific driving mode to another driving mode appropriate for the driving situation. For convenience of explanation, the present disclosure mainly describes provision of two driving modes. However, the present disclosure is not limited thereto.

Driving modes according to an example of the present disclosure may be configured as a first and a second driving mode. The first driving mode may be a mode that controls driving based on a driving maneuver request. The second driving mode may be a mode that controls driving according to an optimization setting established based on a driving maneuver request and a predetermined vehicle operation purpose. The driving maneuver request may be associated with the longitudinal maneuver request described above. The first driving mode may control driving to meet a longitudinal maneuver request. The first driving mode may be a normal mode, for example. The predetermined vehicle operation purpose in the second driving mode may be energy efficiency, safety, and energy remains in the vehicle 100. The second driving mode may be an optimization setting that is established by considering an operation purpose according to the above-described example but does not unconditionally accept a longitudinal maneuver request. For example, the second driving mode may be an Eco mode.

The first driving mode may set first longitudinal acceleration as permissible acceleration for realizing a longitudinal maneuver request. The second driving mode may set second longitudinal acceleration as permissible acceleration that optimizes and satisfies a longitudinal maneuver request and a vehicle operation purpose. The second longitudinal acceleration may be generated to be lower than the first longitudinal acceleration. The first longitudinal acceleration and the second longitudinal acceleration may be set by various methods. A method for setting the first longitudinal acceleration and the second longitudinal acceleration, according to an embodiment, is described in more detail below with reference to FIG. 4.

Figure 4:
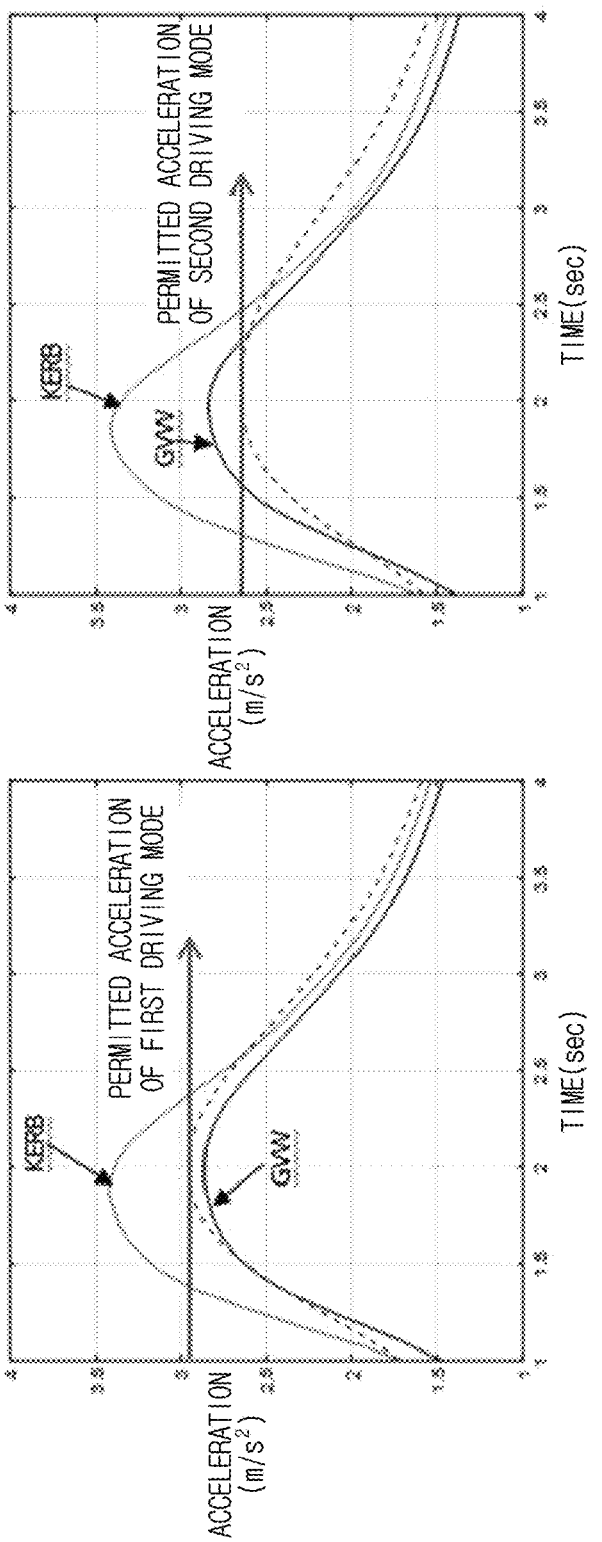
FIG. 4 is a view illustrating permitted acceleration according to various driving modes, according to an embodiment of the present disclosure.

FIG. 4 is a view illustrating permitted acceleration according to the first driving mode and the second driving mode, according to an embodiment. FIG. 4 shows a test result obtained by applying an acceleration limitation function to a bus based on a hydrogen fuel cell. Because of a weight difference between a loaded bus and an unloaded bus, there is a large difference of acceleration between KERB weight and a gross vehicle weight (GVW). It may be desired to improve electricity efficiency and ensure the safety of passengers by preventing excessive acceleration in the unloaded state. In addition, by setting different permissible values of the first longitudinal acceleration and the second longitudinal acceleration according to driving modes and various driving situations, limiting of acceleration may be performed to be suitable for a driving mode and a driving situation, and the effect of limiting acceleration may be maximized. Accordingly, a smaller permissible value of longitudinal acceleration significantly reduces maximum motor torque and maximum current usage of a battery, but limiting to excessively small acceleration may cause degradation of acceleration performance. In order to properly satisfy what is described above, in the first driving mode (normal mode), the first longitudinal acceleration may be set to a value greater than acceleration of the vehicle 100 output at GVW. Further, in the second driving mode (eco mode), it may be set to a smaller value than the acceleration of the vehicle 100 output at GVW.

In an operation S110, the processor 122 may detect whether there is an acceleration limitation situation, based on driving situation information obtained along a driving path.

Driving situation information is information associated with a front path and/or a neighboring path based on a location of the vehicle 100. As described above, driving situation information may be received from the server 200 or may be extracted from detailed data of map information.

An acceleration limitation situation is a situation where a slowdown of a vehicle is required based on driving situation information. For example, the acceleration limitation situation may be a situation where a slowdown is needed according to at least one of a longitudinal direction or a lateral direction. As an example, a longitudinal slowdown may correspond to a longitudinal driving control according to a speed limit derived from driving situation information, and for example, and a lateral slowdown may correspond to a lateral driving control according to a degree of turn permission derived from driving situation information.

According to what is described above, an acceleration limitation situation may include a longitudinal acceleration limitation situation according to a longitudinal direction (+x~−x direction of FIG. 1) of the vehicle 100 and a lateral acceleration limitation situation according to a lateral direction (+y~−y direction of FIG. 1) of the vehicle 100.

A longitudinal acceleration limitation situation requiring a longitudinal slowdown may be determined based on at least traffic information and information associated with a driving caution zone among detailed situation information constituting driving situation information. For example, in the case that traffic information represents a congested or delay situation, the processor 122 may determine that a longitudinal acceleration limitation situation requiring a slowdown has occurred. In the case that a driving caution zone represents a region with auxiliary facilities such as a speed camera and a speed limit sign, a marking region with a mark such as a speed limit on a road, a protection zone like a school zone, or a congested zone, the processor 122 may determine that a longitudinal acceleration limitation situation requiring a slowdown has occurred. According to driving situation information where a slowdown is expected as described in the above example, a situation occurs where deceleration is necessarily required or frequent acceleration/deceleration is needed, and sudden acceleration in the situation may have a negative effect on energy efficiency and riding comfort.

A lateral acceleration limitation situation requiring a lateral slowdown may be determined based on road information associated with at least a road form and information associated with a driving caution zone among detailed situation information constituting driving situation information. For example, in the case that road information is a turning ramp that is an entry/exit of an expressway and the vehicle 100 has an unstable driving feature in the section, the processor 122 may determine that a lateral acceleration limitation situation requiring a slow-down turn has occurred. In the case that case a driving caution zone represents a protection zone, the processor 122 may determine that a lateral acceleration limitation situation has occurred.

If neither longitudinal acceleration limitation situation nor lateral acceleration limitation situation is detected, the processor 122 may control driving of the vehicle 100 according to a predetermined driving mode.

In an operation S115, in response to detecting an acceleration limitation situation, the processor 122 may determine whether a limitation release condition occurs based on at least one of a driving maneuver request for releasing an acceleration limitation situation or a behavior of the vehicle 100.

For example, when detecting a longitudinal acceleration limitation situation, the processor 122 may identify whether a condition for releasing a longitudinal acceleration limitation situation occurs. A driving maneuver request associated with a limitation release condition is a demand of a driver or the processor 122 and may be a maneuver demand associated with a behavior of the vehicle 100 where necessary acceleration is estimated to accompany on a road with the limitation situation. The behavior of the vehicle 100 may be an operation of driving on a route of a vehicle where necessary acceleration is estimated to accompany on a road with the limitation situation. For example, the behavior of the vehicle 100 may be overtaking a vehicle ahead, changing a lane and the like. The driving maneuver request may be a maneuver request for a blinker lever for overtaking a vehicle or changing a lane, a request according to a steering operation of a wheel for overtaking a vehicle, and/or the like.

Heretofore, a limitation release condition has been described mainly in relation to a longitudinal acceleration limitation situation. However, the processor 122 may additionally determine whether a limitation release condition has occurred in relation to a lateral acceleration limitation situation, and the limitation release condition may be set similarly to a release condition for the above-described longitudinal acceleration limitation situation.

When a limitation release condition occurs, the processor 122 may control the vehicle 100 to realize a behavior of the vehicle 100 based on a driving maneuver request corre- sponding to the limitation condition according to a predetermined driving mode. After the behavior of the vehicle 100 according to the limitation release condition is completed, the processor 122 may detect whether there is an acceleration limitation situation and then repeat the processes after the operation S110.

In an operation S120, when the limitation release condition does not occur, the processor 122 may identify situation type information based on driving situation information.

Situation type information may be information including a type of detailed situation information derived by analysis of the detailed situation information and a limitation degree according to the type such that an acceleration limit is generated based on or corresponds to various detailed situation information included in driving situation information. The limitation degree may be designated based on safety requirement, riding comfort, energy efficiency and/or the like according to driving situation information. The limitation degree may be designed to match an acceleration limit corresponding to the driving situation information. In addition, situation type information may include an association between driving situation information and at least one of a longitudinal acceleration limitation situation or a lateral acceleration limitation situation. Thus, situation type information associated with a longitudinal acceleration limitation situation may include a type of driving situation information and a slow-down requirement which is a type of limitation degree. Situation type information associated with a lateral acceleration limitation situation may include a type of driving situation information and a degree of turn permission which is a type of limitation degree.

In an operation S125, the processor 122 may generate an acceleration limit based on situation type information and calculate an acceleration estimate based on a current speed of the vehicle 100.

Based on the situation type information associated with at least one of a longitudinal acceleration limitation situation or a lateral acceleration limitation situation, the processor 122 may generate at least one of a longitudinal acceleration limit corresponding to the longitudinal acceleration limitation situation or a lateral acceleration limit corresponding to the lateral acceleration limitation situation.

A longitudinal acceleration limit may be generated based on second longitudinal acceleration of the second driving mode, irrespective of a driving mode applied to driving. Specifically, the longitudinal acceleration limit may be set to be smaller than the second longitudinal acceleration. The longitudinal acceleration limit may be provided differently according to a slow-down requirement of situation type information. For example, the longitudinal acceleration limit may be different according to detailed situation information based on a limitation degree of situation type information designated based on safety requirement, riding comfort, energy efficiency and/or the like according to detailed situation information of driving situation information. As a correspondence relation between a longitudinal acceleration limit and situation type information is provided in advance, a longitudinal acceleration limit based on driving situation information obtained during driving is selected and generated through the correspondence relation. For example, a longitudinal acceleration limit corresponding to driving situation information with a congested traffic flow may be 0.7 times the second longitudinal acceleration. A longitudinal acceleration limit that corresponds to driving situation information including a facility zone where a speed camera and a speed limit sign are located may be 0.7 times the second longitudinal acceleration, for example. A longitudinal acceleration limit that corresponds to driving situation information including a protection zone, such as a school zone, may be 0.5 times the second longitudinal acceleration.

A lateral acceleration limit may be generated based on a degree of turn permission of situation type information, irrespective of a driving mode applied to driving. For example, the lateral acceleration limit may be different according to detailed situation information based on a limitation degree of situation type information designated based on safety requirement and riding comfort according to detailed situation information of driving situation information. As a correspondence relation between a lateral acceleration limit and situation type information is provided in advance, a lateral acceleration limit based on driving situation information obtained during driving is selected and generated through the correspondence relation. For example, in the case of driving situation information where a vehicle with a high center of gravity is entering a turning ramp that is an entry/exit of an expressway, a lateral acceleration limit may be a limited degree of turn applied to a sloping turn. In the case of driving situation information including a protection zone, such as a school zone, a lateral acceleration limit may be a limited degree of turn applied to the protection zone.

Figure 5:
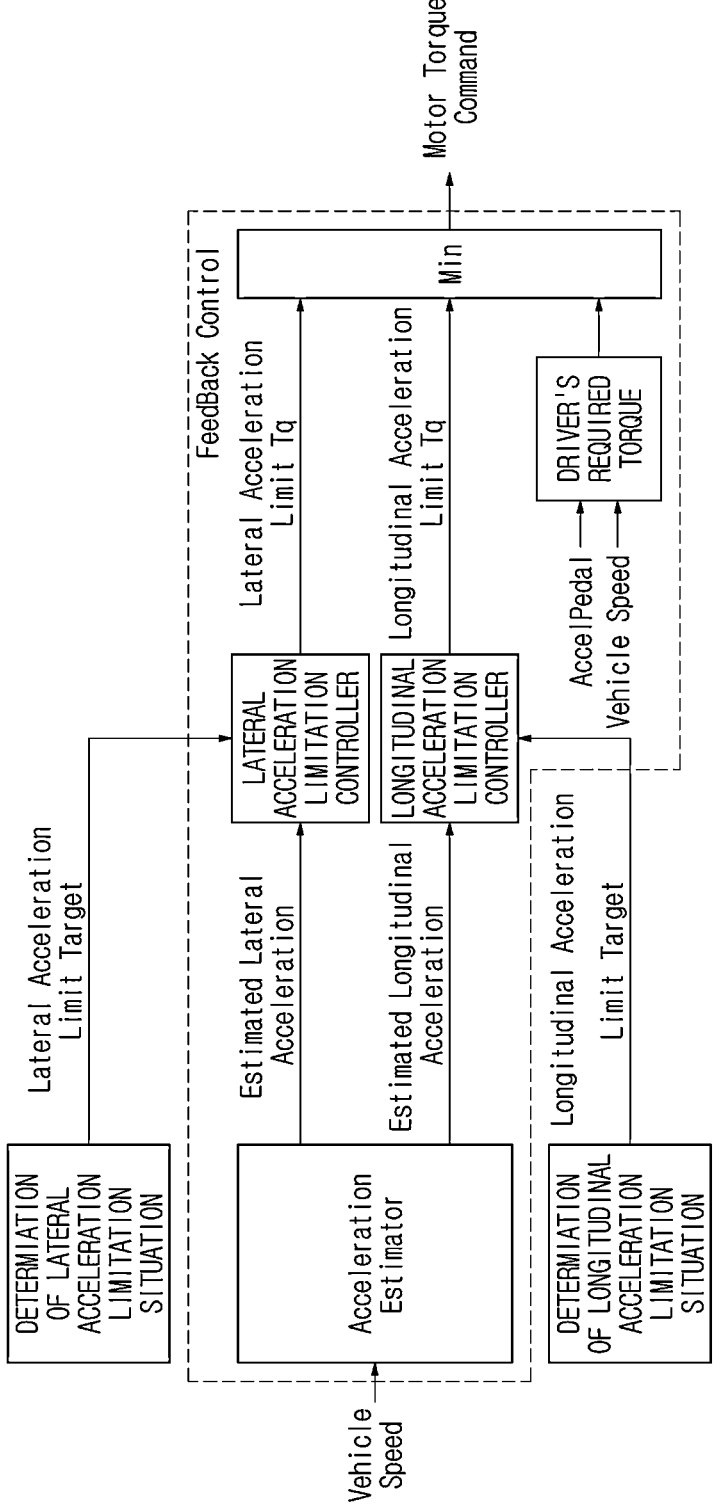
FIG. 5 is a functional module diagram of a processor that may implement a method for limiting active acceleration, according to an embodiment of the present disclosure.

Referring now FIG. 5, the processor 122 may calculate an acceleration estimate based on a longitudinal speed of the vehicle 100 and a lateral speed of the vehicle 100. FIG. 5 is a functional module diagram of a processor that may implement a method for limiting active acceleration, according to an embodiment. In order to correspond to an acceleration limit, an acceleration estimate may include a longitudinal acceleration estimate and a lateral acceleration estimate. A longitudinal acceleration estimate may be calculated based on a longitudinal speed. For example, the longitudinal acceleration estimate may be calculated based on a driving speed measured by the speed sensor 104c. A lateral acceleration estimate may be calculated based on a lateral speed. For example, the lateral acceleration estimate may be calculated based on a degree of turn of the vehicle 100 according to a steering angular speed.

Figure 6:
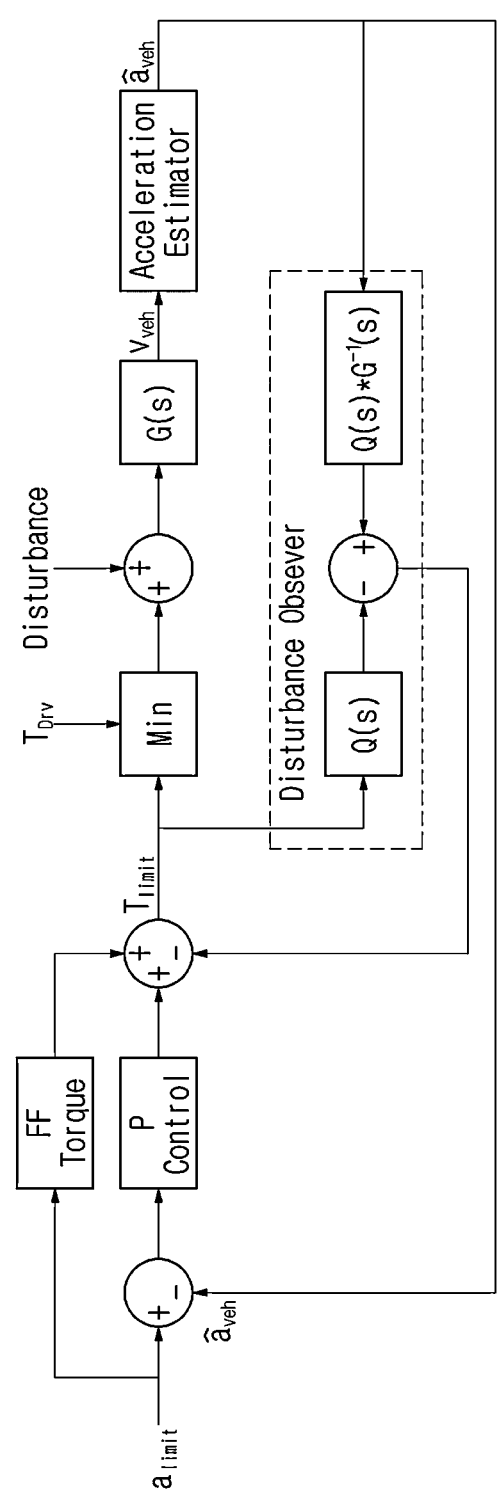
FIG. 6 is a view illustrating a control loop that generates control torque, according to an embodiment of the present disclosure.

Because an acceleration estimate may vary according to a speed change during driving, the acceleration estimate may be calculated by a method based on a current speed and another parameter. FIG. 6 is a view illustrating a control loop that generates control torque, according to an embodiment. As illustrated in FIG. 6, a longitudinal acceleration estimate may be calculated using a feedback method based on disturbance observer based control (DOBC). The feedback-based calculation may be performed by modules in the dotted box of FIG. 5. As the feedback method has modeling according to a weight of the vehicle 100 (e.g., G(s) of FIG. 6), a longitudinal acceleration estimate is accurately calculated by reflecting the effect of a weight, thereby improving control robustness. For example, a weight may be an aggregate of a loaded weight and an unloaded weight that are obtained from the weight sensor 104b. In addition, the feedback method may calculate a longitudinal acceleration estimate based on a previous longitudinal acceleration estimate, a current driving speed (v_veh) of the vehicle 100, a longitudinal acceleration limit (a limit), and a longitudinal acceleration torque limit (T_limit) to be described below. For reference, T_Drv is driving maneuver requirement torque. The control loop of the feedback method illustrated in FIG. 6 may be similarly used to calculate a lateral acceleration estimate. The feedback method includes modeling according to a weight of the vehicle 100. The feedback method may calculate a lateral acceleration estimate based on a previous lateral acceleration estimate, a current degree of turn of the vehicle 100, a lateral acceleration limit, and a lateral acceleration torque limit, as described in more detail below.

In an operation S130, the processor 122 may calculate an acceleration torque limit based on an acceleration limit and an acceleration estimate.

Referring to FIG. 5 illustrating a functional module of the processor 122, a longitudinal acceleration estimate, detailed situation information associated with a longitudinal acceleration limitation situation, and corresponding situation type information are input into a longitudinal acceleration limitation controller. The longitudinal acceleration limitation controller may generate a longitudinal acceleration limit and then calculate a longitudinal acceleration torque limit based on the generated longitudinal acceleration limit. A lateral acceleration estimate, detailed situation information associated with a lateral acceleration limitation situation, and corresponding situation type information are input into a lateral acceleration limitation controller, The lateral acceleration limitation controller may generate a lateral acceleration limit and then calculate a lateral acceleration torque limit based on the generated lateral acceleration limit.

The present disclosure describes calculation of an acceleration torque limit based on an acceleration limit and an acceleration estimate. As another example, although an acceleration estimate is omitted, an acceleration torque limit may be calculated using a factor including at least an acceleration limit.

In an operation S135, the processor 122 may receive required torque according to a driving maneuver request.

For example, a driving maneuver request may be recognized by the acceleration maneuver sensor 104d. For example, a driving maneuver request may be perceived by detecting a change of a pedal for longitudinal acceleration or may be perceived by detecting a rotating amount of a steering wheel for lateral acceleration. The driving maneuver request is not limited the above description and may be listed by various examples described in association with FIG. 2, for example. As shown in FIG. 5, required torque may include at least one of longitudinal required torque or lateral required torque according to longitudinal and lateral driving maneuver requests.

In an operation S140, the processor 122 may determine a smaller torque among acceleration limitation torque based on an acceleration limit and required torque according to a driving maneuver request as control torque.

For example, as for longitudinal acceleration control, a smaller torque among a longitudinal acceleration torque limit and longitudinal required torque may be determined as longitudinal control torque. As for lateral acceleration control, a smaller torque among a lateral acceleration torque limit and lateral required torque may be determined as lateral control torque.

In an operation S145, the processor 122 may control driving of the vehicle based on acceleration according to the control torque, when entering a path corresponding to an acceleration limitation situation. For example, driving control may be performed based on longitudinal control torque and lateral control torque.

In the above description, both a longitudinal acceleration limitation situation and a lateral acceleration limitation situation occur so that longitudinal control torque and lateral control torque are generated. However, embodiments of the present disclosure may also be applied to a situation where at least one of a longitudinal acceleration limitation situation or a lateral acceleration limitation situation occurs so that corresponding control torque is generated according to a generated limitation situation.

Embodiments of the present disclosure not only realize reduced acceleration torque and enhanced energy efficiency, but also ensure riding comfort, an occupant's safety, and safety of a neighboring object, such as a pedestrian, during launch acceleration.

While example methods of the present disclosure described above are represented as a series of operations for clarity of description, it is not intended to limit the order in which the operations are performed. In some embodiments, I operations may be performed simultaneously or in different order as necessary. In some embodiments, the described operations may further include other operations, may include operations in place of some of the described operations, and/or may include other operations in addition to the described operations.

The described embodiments of the present disclosure do not constitute a list of all possible combinations. The described embodiments are merely intended to describe representative aspects of the present disclosure. The matters described in the various embodiments may be applied independently or in combination of two or more.

Various embodiments of the present disclosure may be implemented in hardware, firmware, software, or a combination thereof. In the case of implementing embodiments of the present disclosure in hardware, the embodiments can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable commands (e.g., an operating system, an application, firmware, a program, etc.) for enabling operations according to the methods of various embodiments to be executed on an apparatus or a computer, and a non-transitory computer-readable medium having such software or commands stored thereon and executable on the apparatus or the computer.

What is claimed is:

1. A method for limiting active acceleration of a vehicle according to a driving situation, the method comprising:

detecting presence of an acceleration limitation situation based on driving situation information;

determining an acceleration estimate based on a feedback method including modeling according to a weight of the vehicle;

in response to detecting the presence of the acceleration limitation situation, generating an acceleration limit based on situation type information identified in the driving situation information and the acceleration estimate;

determining, as control torque, a smaller torque among an acceleration torque limit based on the acceleration limit and required torque according to a driving maneuver request; and controlling driving of the vehicle based on acceleration according to the control torque on a path corresponding to the acceleration limitation situation.

2. The method of claim 1, wherein the driving situation information includes traffic information and road information, wherein i) the traffic information includes a traffic flow state around the vehicle and ii) the road information includes information on at least one of a driving caution zone or a road form, wherein the driving caution zone includes at least one of i) a facility zone in which a supplementary facility for deriving or monitoring a speed limit is located, ii) a sign zone in which a sign object associated with a speed limit is located, iii) a protection zone for protecting a predetermined object, or iv) a congested zone that is estimated to have a degree of road congestion equal to or greater than a predetermined value.

3. The method of claim 1, wherein the presence of the acceleration limitation situation is detected based on estimating that the vehicle is required to slow down based on the driving situation information.

4. The method of claim 1, wherein:

the acceleration limitation situation includes a longitudinal acceleration limitation situation according to a longitudinal direction of the vehicle or a lateral acceleration limitation situation according to a lateral direction of the vehicle;

generating of the acceleration limit includes generating at least one of i) a longitudinal acceleration limit corresponding to the longitudinal acceleration limitation situation or ii) a lateral acceleration limit corresponding to the lateral acceleration limitation situation based on the situation type information associated with at least one of the longitudinal acceleration limitation situation or the lateral acceleration limitation situation;

the acceleration torque limit includes at least one of i) a longitudinal acceleration torque limit based on the longitudinal acceleration limit or ii) a lateral acceleration torque limit based on the lateral acceleration limit; and the required torque includes at least one of longitudinal required torque or lateral required torque.

5. The method of claim 4, wherein a driving mode operated for driving of the vehicle includes i) a first driving mode that controls driving based on the driving maneuver request and ii) a second driving mode that a) controls driving according to an optimization setting established based on the driving maneuver request and a predetermined vehicle operation purpose and b) applies second longitudinal acceleration smaller than first longitudinal acceleration applied to the first driving mode, wherein the longitudinal acceleration limit is generated based on the second longitudinal acceleration.

6. The method of claim 5, wherein the longitudinal acceleration limit i) is set to be smaller than the second longitudinal acceleration and ii) is generated according to detailed situation information of the driving situation information based on a slow-down requirement of the situation type information.

7. The method of claim 4, wherein the lateral acceleration limit is generated according to detailed situation information of the driving situation information based on a degree of turn permission of the situation type information.

8. The method of claim 1, wherein the acceleration torque limit is further based on the acceleration estimate calculated based on at least one of a driving speed of the vehicle or a degree of turn of the vehicle.

9. The method of claim 8, wherein the acceleration estimate is calculated by using the feedback method, wherein the feedback method calculates the acceleration estimate based on a previous acceleration estimate, the driving speed of the vehicle, the degree of turn of the vehicle, the acceleration limit, and the acceleration torque limit.

10. The method of claim 1, further comprising:

prior to the generating of the acceleration limit, detecting whether a limitation release condition occurs by at least one of the driving maneuver request for releasing the acceleration limitation situation or a behavior of the vehicle; and in response to detecting that the limitation release condition occurs, controlling the driving of the vehicle based on the driving maneuver request without generating the acceleration limit.

11. A vehicle, comprising:

a sensor unit configured to detect a state of the vehicle and a maneuver for the vehicle;

a memory configured to store at least one instruction for controlling the vehicle; and a processor configured to execute the at least one instruction stored in the memory, wherein the processor is further configured to detect presence of an acceleration limitation situation based on driving situation information, determine an acceleration estimate based on a feedback method including modeling according to a weight of the vehicle, in response to detecting the presence of the acceleration limitation situation, generate an acceleration limit based on situation type information identified in the driving situation information and the acceleration estimate, determine, as control torque, a smaller torque among an acceleration torque limit based on the acceleration limit and required torque according to a driving maneuver request, and control driving of the vehicle based on acceleration according to the control torque on a path corresponding to the acceleration limitation situation.

12. The vehicle of claim 11, wherein the driving situation information includes traffic information and road information, wherein i) the traffic information includes a traffic flow state around the vehicle and ii) the road information has information on least one of a driving caution zone and a road form, and wherein the driving caution zone includes at least one of i) a facility zone in which a supplementary facility for deriving or monitoring a speed limit is located, ii) a sign zone in which a sign object associated with a speed limit is located, iii) a protection zone for protecting a predetermined object, or iv) a congested zone that is estimated to have a degree of road congestion equal to or greater than a predetermined value.

13. The vehicle of claim 11, wherein the presence of the acceleration limitation situation is detected based on estimating that the vehicle is required to slow down based on the driving situation information.

14. The vehicle of claim 11, wherein:

the acceleration limitation situation includes a longitudinal acceleration limitation situation according to a longitudinal direction of the vehicle and a lateral acceleration limitation situation according to a lateral direction of the vehicle;

generating the acceleration limit includes generating at least one of i) a longitudinal acceleration limit corresponding to the longitudinal acceleration limitation situation or ii) a lateral acceleration limit corresponding to the lateral acceleration limitation situation based on the situation type information associated with at least one of the longitudinal acceleration limitation situation or the lateral acceleration limitation situation;

the acceleration torque limit includes at least one of i) a longitudinal acceleration torque limit based on the longitudinal acceleration limit or ii) a lateral acceleration torque limit based on the lateral acceleration limit; and the required torque includes at least one of longitudinal required torque or lateral required torque.

15. The vehicle of claim 14, wherein a driving mode operated for driving of the vehicle includes i) a first driving mode that controls driving based on the driving maneuver request and ii) a second driving mode that a) controls driving according to an optimization setting established based on the driving maneuver request and a predetermined vehicle operation purpose and b) applies second longitudinal acceleration smaller than first longitudinal acceleration applied to the first driving mode, and wherein the longitudinal acceleration limit is generated based on the second longitudinal acceleration.

16. The vehicle of claim 15, wherein the longitudinal acceleration limit i) is set to be smaller than the second longitudinal acceleration and ii) is generated according to detailed situation information of the driving situation information based on a slow-down requirement of the situation type information.

17. The vehicle of claim 14, wherein the lateral acceleration limit is generated according to detailed situation information of the driving situation information based on a degree of turn permission of the situation type information.

18. The vehicle of claim 11, wherein the acceleration torque limit is further based on the acceleration estimate calculated based on at least one of a driving speed of the vehicle or a degree of turn of the vehicle.

19. The vehicle of claim 18, wherein the acceleration estimate is calculated by using the feedback method, wherein the feedback method calculates the acceleration estimate based on a previous acceleration estimate, the driving speed of the vehicle, the degree of turn of the vehicle, the acceleration limit, and the acceleration torque limit.

20. The vehicle of claim 11, wherein the processor is further configured to:

prior to generating the acceleration limit, detect whether a limitation release condition occurs by at least one of i) the driving maneuver request for releasing the acceleration limitation situation or ii) a behavior of the vehicle; and in response to detecting that the limitation release condition occurs, control the driving of the vehicle based on the driving maneuver request without generating the acceleration limit.

* * * * *